US012802319B2

(12) United States Patent
Yu et al.

(10) Patent No.: US 12,802,319 B2
(45) Date of Patent: Nov. 17, 2026

(54) SYSTEMS AND METHODS FOR MULTI-KERNEL SYNTHESIS AND KERNEL CONVERSION IN MEDICAL IMAGING

(71) Applicant: Mayo Foundation for Medical Education and Research, Rochester, MN (US)

(72) Inventors: Lifeng Yu, Byron, MN (US); Andrew D. Missert, Rochester, MN (US); Shuai Leng, Rochester, MN (US); Cynthia H. McCollough, Byron, MN (US); Joel G. Fletcher, Oronoco, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 385 days.

(21) Appl. No.: 18/553,698

(22) PCT Filed: Apr. 4, 2022

(86) PCT No.: PCT/US2022/023335

§ 371 (c)(1),
(2) Date: Oct. 2, 2023

(87) PCT Pub. No.: WO2022/212953

PCT Pub. Date: Oct. 6, 2022

(65) Prior Publication Data

US 2024/0177378 A1 May 30, 2024

Related U.S. Application Data

(60) Provisional application No. 63/170,064, filed on Apr. 2, 2021.

(51) Int. Cl.
*G06K 9/00* (2022.01)
*G06T 12/30* (2026.01)

(52) U.S. Cl.
CPC ........ *G06T 12/30* (2026.01); *G06T 2211/441* (2023.08)

(58) Field of Classification Search
CPC ............. G06T 11/008; G06T 2211/441; G06T 2211/421; G06T 2207/20084;
(Continued)

(56) References Cited

U.S. PATENT DOCUMENTS

| | | |
|---|---|---|
| 7,920,669 B2 | 4/2011 | Krauss et al. |
| 8,805,042 B2 | 8/2014 | Weiss |

(Continued)

FOREIGN PATENT DOCUMENTS

| | | |
|---|---|---|
| CN | 1504931 A | 6/2004 |
| CN | 107392868 A | 11/2017 |

(Continued)

OTHER PUBLICATIONS

Huber, Nathan R., et al. "Random search as a neural network optimization strategy for Convolutional-Neural-Network (CNN)-based noise reduction in CT." Medical Imaging 2021: Image Processing. vol. 11596. SPIE, Feb. 2021. (Year: 2021).*

(Continued)

*Primary Examiner* — Gregory A Morse
*Assistant Examiner* — Owais I Memon
(74) *Attorney, Agent, or Firm* — Quarles & Brady LLP

(57) ABSTRACT

Systems and methods are provided for synthesizing information from multiple image series of different kernels into a single image series using deep-learning based methods trained using a task-based loss function that includes a sharp loss term and a smooth loss term that parameterize training. For multi-kernel synthesis, a single set of images with desired high spatial resolution and low image noise can be synthesized from multiple image series of different kernels. The synthesized kernel is sufficient for a wide variety of
(Continued)

clinical tasks, even in circumstances that would otherwise require many separate image sets. Kernel conversion may be configured to generate images with arbitrary reconstruction kernels from a single baseline kernel. This would reduce the burden on the CT scanner and the archival system, and greatly simplify the clinical workflow.

18 Claims, 9 Drawing Sheets

(58) Field of Classification Search
CPC . G06T 2207/20081; G06T 2207/10081; G06T 7/0012; G06T 5/70; G06N 3/0464; G06N 3/045; G06N 3/08; G06N 3/09; G16H 30/40
See application file for complete search history.

(56) References Cited

U.S. PATENT DOCUMENTS

| | | | | |
|---|---|---|---|---|
| 2006/0210131 | A1 | 9/2006 | Wheeler et al. | |
| 2010/0246917 | A1 | 9/2010 | Bruder et al. | |
| 2017/0206680 | A1 | 7/2017 | Tung et al. | |
| 2018/0018757 | A1 | 1/2018 | Suzuki | |
| 2019/0021677 | A1* | 1/2019 | Grbic | G06T 7/11 |
| 2019/0035117 | A1 | 1/2019 | Xing et al. | |
| 2019/0108634 | A1 | 4/2019 | Zaharchuk et al. | |
| 2020/0043204 | A1 | 2/2020 | Fu et al. | |
| 2022/0172353 | A1* | 6/2022 | Yi | G16H 30/40 |

FOREIGN PATENT DOCUMENTS

| | | | |
|---|---|---|---|
| CN | 107633540 | A | 1/2018 |
| EP | 3576049 | A2 | 12/2019 |
| WO | 2012168813 | A1 | 12/2012 |

OTHER PUBLICATIONS

Missert, A. D., et al. "Synthesizing images from multiple kernels using a deep convolutional neural network." Medical Physics 47.2 (2019): 422-430. (Year: 2019).*

Chen, H. et al., Low-Dose CT Denoising with Convolutional Neural Network, 2017 IEEE 14th International Symposium on Biomedical Imaging (ISBI 2017), pp. 143-146.

Chen, S. et al., Towards Automatic Abdominal Multi-Organ Segmentation in Dual Energy CT Using Cascaded 3D Fully Convolutional Network, arXiv:1710.05379, 2017, 6 pages.

Dorn, S. et al., Organ-Specific Context-Sensitive Single and Dual Energy CT (DECT) Image Reconstruction, Display and Analysis, 103rd Scientific Assembly and Annual Meeting of the Radiological Society of North America (RSNA), 2017, 20 pages.

He, K. et al., Deep Residual Learning for Image Recognition, arXiv:1512.03385, 2015, pp. 1-12.

Huber, N. et al., Random Search as a Neural Network Optimization Strategy for Convolutional-Neural-Network (CNN)-Based Noise Reduction in CT, Medical Imaging 2021: Image Processing, Proc. of SPIE, 2021, vol. 11596, pp. 1-7.

Kamil, M., Brain Tumor Area Calculation in CT-Scan Image Using Morphological Operations, IOSR Journal of Computer Engineering, 2015, 17(2):125-128.

McCollough, C. et al., Low-Dose CT for the Detection and Classification of Metastatic Liver Lesions: Results of the 2016 Low Dose CT Grand Challenge, Medical Physics, 2017, 44(10):e339-e352.

Missert, A. et al., Synthesizing Images from Multiple Kernels Using a Deep Convolutional Neural Network, Medical Physics, 2020, 47(2):422-430.

Sasidhar, B. et al., Automated Segmentation of Lung Regions Using Morphological Operators in CT Scan, International Journal of Scientific & Engineering Research, 2013, 4(9):1114-1118.

Takagi, S. et al., Combined Multi-Kernel Head Computed Tomography Images Optimized for Depicting Both Brain Parenchyma and Bone, Journal of X-Ray Science and Technology, 2014, 22(3):369-376.

Weiss, K. et al., Hybrid Convolution Kernel: Optimized CT of the Head, Neck, and Spine, American Journal of Roentgenology, 2011, 196(2):403-406.

Woo, I. et al., Accuracy Enhancement of CT Kernel Conversions Using Convolutional Neural Net for Super-Resolution with Squeeze-and-Excitation Blocks and Progressive Learning Among Smooth and Sharp Kernels, 1st Conference on Medical Imaging and Deep Learning (MIDL 2018), pp. 1-3.

Xie, S. et al., Aggregated Residual Transformations for Deep Neural Networks, In Proceedings of the IEEE Conference on Computer Vision and Pattern Recognition, 2017, pp. 1492-1500.

Xue, Z. et al., Window Classification of Brain CT Images in Biomedical Articles, In AMIA Annual Symposium Proceedings, 2012, vol. 2012, pp. 1023-1029.

Yu, L. et al., Development and Validation of a Practical Lower-Dose-Simulation Tool for Optimizing Computed Tomography Scan Protocols, Journal of Computer Assisted Tomography, 2012, 36(4):477-487.

PCT International Search Report and Written Opinion, PCT/US2022/023335, Jul. 25, 2022, 12 pages.

* cited by examiner

SYSTEMS AND METHODS FOR MULTI-KERNEL SYNTHESIS AND KERNEL CONVERSION IN MEDICAL IMAGING

CROSS-REFERENCE TO RELATED APPLICATIONS

This application claims the benefit of U.S. Provisional Patent Application Ser. No. 63/170,064 filed on Apr. 2, 2021 and entitled "Systems and Methods for Multi-Kernel Synthesis and Kernel Conversion in Medical Imaging," which is herein incorporated by reference in its entirety.

BACKGROUND

X-ray computed tomography (CT) is an imaging modality with broad clinical usage in disease diagnosis, therapy monitoring, and image guided intervention covering all major human anatomy. CT scans acquire x-ray projection data that must be reconstructed to form human-interpretable three-dimensional images of patient's anatomy. This image reconstruction process requires setting parameters such as the reconstruction slice thickness and convolution kernel, which can greatly affect the level of noise and the spatial resolution of the resulting images.

CT scanners differ substantially in x-ray sources, detectors, data acquisition systems, and reconstruction algorithms, but the general clinical workflow, including generating image series, image archival, retrieval, and display, remains very similar among most scanners. Images at different kernels (e.g., smooth, medium sharp, sharp, and the like), slice thicknesses, and intervals at different 3D planes are typically reconstructed from CT projection data. Some of these images can also be generated by 3D reformatting from already reconstructed images.

In order to properly assess the patient's medical condition, radiologists interpret image features from a variety of tissue types. Some diagnostic tasks rely on the detection of low-contrast features, whereas other tasks may require resolving small anatomical details at higher contrast levels. Low-contrast image features are most conspicuous at low noise levels, which is typically achieved using thicker reconstructed slices and low-pass reconstruction kernels at the cost of increased partial volume averaging and worse axial spatial resolution. Small-scale and high-contrast image features, on the other hand, can be better interpreted using thin slices and high-pass kernels at the cost of increased noise levels.

Selection of an appropriate reconstruction kernel is a step in reconstructing CT images that can greatly influence the appearance and clinical utility of the reconstructed image. That is, the choice of kernel can have a dramatic effect on the appearance of the reconstructed image. A very sharp kernel results in well-defined edges and high spatial resolution, but also amplifies image noise. On the other hand, a very smooth kernel reduces the noise, but comes at the cost of blurring sharp edges and fine anatomical details. This fundamental tradeoff means that diagnostic tasks may require multiple image sets, each reconstructed with different kernels, in order to evaluate all aspects of the images and achieve an accurate diagnosis.

Due to this inherent tradeoff between image noise and spatial resolution there is currently no single image volume (often called series) that is optimal for all diagnostic tasks; including in those challenging scenarios where high spatial resolution is desired, but at low-contrast levels. Image-based diagnosis is complex, covering diverse anatomy and having several objectives; thus, it is routine in the clinical setting to reconstruct several image series from the same projection data. As an example, CT head trauma imaging is one such application that employs thin slices reconstructed with sharp kernels to detect fractures. CT head trauma imaging also uses both thick and thin slices reconstructed with smooth kernels for soft tissue imaging of the brain to detect hemorrhages and infarctions, resulting in at least three reconstructed series per scan.

Which image series is created depends on the clinical exams and diagnostic tasks. For example, trauma, musculoskeletal, thoracic and neurological CT exams can require ten or more separate reconstructions for a single patient scan, many of which use different kernel settings. It is not uncommon that some of the exams require many image series in a variety of configurations to be created and archived. Large numbers of image series being created and stored may put a huge burden on technologists, increase the burden on the archival system, increase reconstruction time, and slow down the scanner, which is problematic in a busy clinical environment. In addition, even if the exam protocol specifies a large number of image series to be generated at a variety of kernels and slice thicknesses, sometimes one would later like to have additional image series reconstructed in a manner that differs greatly from all images that have been archived. Since CT projection data are typically deleted from the scanner within a few days after the exam, it is unlikely that the data will be available to generate the needed image series at a later date.

One potential solution that could preserve the ability to reconstruct different kernel images at any time is to archive the CT projection data. There are many reasons why this is not feasible. First, CT projection data are usually large files that are difficult to transfer through a network. Second, most archival systems don't support the format of CT projection data, which are all encoded with proprietary information by the manufacturers of the CT systems. Most importantly, even if the CT projection data are available and can be interpreted correctly, the reconstruction system that is necessary to generate images from the projection data might not readily be available. This is because the reconstruction system is vendor and scanner-model specific and may be upgraded from time to time, making older projection data unusable.

Other approaches have relied upon replacing image voxels obtained with smooth kernels and corresponding to high contrast bone anatomy with sharp kernel voxels, thereby producing a single image with matched diagnostic performance as the two individual kernel images. However, such threshold-based multi-kernel methods are prone to stair-step discontinuity artifacts at the brain-skull boundary and require matching slice thicknesses, which could be suboptimal for each kernel. Other approaches utilizing iterative reconstruction spatially vary their regularization function over different anatomy to control the local smoothness, but at the cost of increased computation time.

Compared to abdominal imaging, head imaging poses additional challenges. Interpreting CT images of the head is a challenging diagnostic task that requires attention to both low-contrast features in the brain and high-resolution features in the skull. In addition to high spatial resolution requirements to detect fractures in the skull, Hounsfield unit (HU) differences in the brain, particularly between gray and white matter, are especially small. For these reasons, multiple image series are routinely reconstructed with different kernel and slice thickness configurations to meet these image quality requirements. This places a burden on technologists and radiologists to prepare and interpret different image series for a single exam.

Navigating and maintaining the plethora of available reconstruction kernels also creates numerous opportunities for errors, and therefore introduces a substantial burden on CT manufacturers, technologists, and radiologists reading CT images. There exists a need for both reducing the burden of multiple kernels and also for preserving the ability to generate different images with different kernels after the projection data has been lost.

SUMMARY OF THE DISCLOSURE

The present disclosure addresses the aforementioned drawbacks by providing a system and method for synthesizing information from multiple image series of different kernels into a single image series using deep-learning based methods trained using a task-based loss function that includes a sharp loss term and a smooth loss term that parameterize training. For multi-kernel synthesis, a single set of images with desired high spatial resolution and low image noise can be synthesized from multiple image series of different kernels. The synthesized kernel is sufficient for a wide variety of clinical tasks, even in circumstances that would otherwise require many separate image sets.

In one configuration, a method is provided for synthesizing computed tomography (CT) image series. The method includes reconstructing at least two CT image series. The two image series are reconstructed with different reconstruction kernels. The method also includes synthesizing at least one new CT image series by applying the at least two CT image series to an artificial neural network that has been trained on training data using a task-based loss function comprising a sharp loss term that trains the neural network for similarity with a sharp kernel target and a smooth loss term that trains the neural network for similarity with a smooth kernel target.

In one configuration, a system is provided for synthesizing computed tomography (CT) image series. The system includes a computer system configured to reconstruct at least two CT image series. The at least two image series are reconstructed with different reconstruction kernels. The computer system is also configured to synthesize at least one new CT image series by applying the at least two CT image series to an artificial neural network that has been trained on training data using a task-based loss function comprising a sharp loss term that trains the neural network for similarity with a sharp kernel target and a smooth loss term that trains the neural network for similarity with a smooth kernel target.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1A:
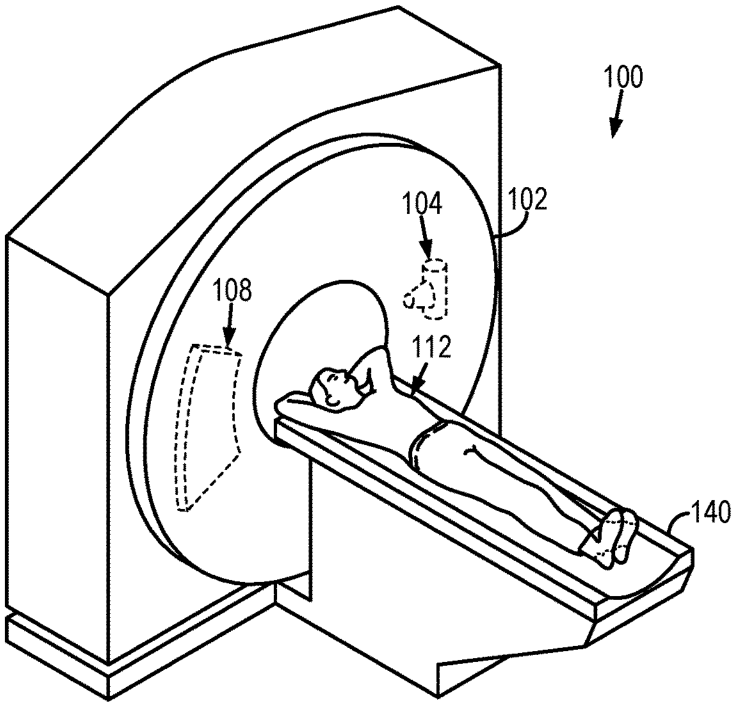
FIG. 1A illustrates an example CT system that can be configured to operate one configuration of the present disclosure.

A system and method is provided for synthesizing information from multiple image series reconstructed with different kernels into a single image series, and also to generate image series with different kernels from a single image series reconstructed from the scanner. A single set of images may be synthesized with the best qualities of images reconstructed using multiple kernels that can be used for a wide variety of tasks. In addition, a method may employ a loss function with deep learning-based systems, such as a deep convolutional neural network (CNN), to generate images with different kernels from one single image series reconstructed by the scanner with a sharp kernel. This method may be used to generate images at different kernels in just a fraction of the time it takes to run a full reconstruction, and may do so without using the raw projection data.

Diagnostic CT imaging for head trauma is a type of exam that requires image quality features with conflicting requirements in terms of noise and spatial resolution, particularly when using filtered back projection (FBP) reconstruction. Diagnostic tasks in the brain require differentiation of very low-contrast image features, which are typically only discernable on thick-slice (e.g., 5 mm) reconstructions using smooth kernels and a very narrow window level setting. On the other hand, diagnostic tasks in boney regions requires high spatial resolution to resolve small-scale features such as skull fractures, thus very sharp reconstruction kernels (sometimes with edge enhancement) and thin slices are the clinical norm. In order to bridge the gap between these very different image configurations, the noise level of the sharp-kernel reconstructions may need to be reduced by a factor of 16 or greater while maintaining both spatial resolution and soft-tissue contrast.

Low-pass reconstruction kernels, such as for the head, may be used with additional post-processing steps to enhance the small differences between gray and white matter and aid in the detection of low-contrast lesions. In some configurations a method for synthesized Improved Resolution and Concurrent noise reduction (ZIRCON), is provided. The systems and methods may include a denoising and image synthesis CNN-model that uses a loss function with two complementary loss terms to parameterize training. The systems and methods have been validated in the ability to reduce noise and enhance soft tissue contrast. In a non-limiting example, reduced noise and enhanced soft tissue contrast was achieved in the brain while preserving sharp details in the skull, effectively combining the favorable image quality features of each input kernel into a single image series optimized for imaging of the head.

The output of the systems and methods may be a single low-noise and high-resolution image series that may be used to perform diagnostic tasks that would otherwise require multiple series with different reconstruction parameters. Processed or synthesized images may have noise levels less than or equal to the noise levels of the corresponding smooth-kernel reconstructions. The synthesized images may maintain the soft-tissue contrast of the corresponding smooth-kernel reconstructions. The synthesized images may maintain the spatial resolution of the corresponding sharp-kernel reconstructions. The synthesized images may also not introduce artifacts that could affect diagnostic performance.

Although the advantages and disadvantages of smooth and sharp kernels are understood, it was not previously possible to combine the advantages of images reconstructed using different kernels into a single set of images. No generalized algorithm has previously been developed that is able to blend together images created with multiple kernels to produce an output image that matches or exceeds the clinical utility of each input image individually. Synthesizing information from multiple image series, each reconstructed with a different kernel, into a single image series allows for combining the advantages of different kernels. The application of an artificial neural network allows for circumventing the difficult task of determining hand selected rules for combining features in the input images. Instead of using predetermined rules, a network training procedure may determine how the input features should be merged to produce an optimal output image. Since the application of a trained neural network is very fast, this adds negligible computation time to the image reconstruction process, and opens up the possibility of applying the network in real time.

For the purposes of this disclosure and accompanying claims, the term "real time" or related terms are used to refer to and define a real-time performance of a system, which is understood as performance that is subject to operational deadlines from a given event to a system's response to that event. For example, a real-time extraction of data and/or displaying of such data based on empirically-acquired signals may be one triggered and/or executed simultaneously with and without interruption of a signal-acquisition procedure.

In some configurations, a convolutional neural network (CNN)-based multi-kernel synthesis may include a task-based loss able to parameterize specific image quality requirements. A CNN denoising and kernel synthesis model may be used with a task-based training routine to generate a single thin slice, low noise, soft tissue contrast enhanced, sharp detail preserved image series. The resulting image series is able to combine the desired image quality properties of each input series into a single output containing the desired properties of each and lower noise in a thin slice.

In some configurations, a CNN may be trained to synthesize multiple input image series, each produced with a different reconstruction kernel, into a single output image series that exhibits improved image qualities (in terms of high sharpness and low noise levels) compared to each input individually. The CNN architecture may be based on any of a variety of selected design, such as a ResNet design, and may include repeated blocks of residual units with a plurality of layers, such as a total of 32 convolutional layers. The CNN inputs may include a selection from original images, such as images produced by soft (e.g., B10), medium-sharp (e.g., B45), and sharp (e.g., B70) kernels that may be stacked in the channel dimension. The CNN output may be treated as a perturbation that may be added to the sharp-kernel input, which may reduce the required training time. The network may be trained using supervised learning with full-dose images, reduced dose images, simulated images, such as simulated quarter-dose CT images, or other lower dose images, and the like.

In some configurations, the full-dose images reconstructed with a sharp kernel may be used as the ground truth to evaluate a comparative loss function, such as with a mean squared error function. In some configurations, a loss function may include a task-based loss function. In a non-limiting example, a task-based loss function may include two task-based loss terms, although any number of terms may be used. A first term may be used to enforce similarity with the sharp kernel target images in the HU range outside of the brain (<0 or >80) while penalizing sharp kernel noise within the brain HU range using total variation loss. The second term may be used to enforce similarity with the smooth kernel target images within the brain HU range.

CT image reconstruction kernels can be broadly characterized in terms of noise and spatial resolution properties as being either "smooth" (lower spatial resolution and lower noise) or "sharp" (higher spatial resolution and higher noise). Images reconstructed with smooth kernels ($x_{smooth}$) are optimal for interpreting low-contrast features, whereas images reconstructed with sharp kernels ($x_{sharp}$) are optimal for interpreting features at small spatial scales. In accordance with the present disclosure, a framework is provided to combine the clinically desirable features from smooth-kernel images and the clinically desirable features from sharp-kernel images into a single image series. A parameterized function may be used:

$$\Phi(x_{smooth}, x_{sharp}, \theta) = z, \tag{1}$$

such that the synthesized image z has the characteristic spatial resolution of $x_{sharp}$ while also having the low noise level of $x_{smooth}$. Φ may be modeled using a deep convolutional neural network (CNN).

If examples of ideal synthesized images z were known a priori, then the parameters θ could be optimized using supervised learning with e.g. stochastic gradient descent:

$$\theta \to \theta - \eta \nabla_\theta \left( \frac{1}{N} \sum_i^N L(\hat{z}_i, z_i) \right), \tag{2}$$

where L denotes the loss function L (e.g the Frobenius norm of ($z_{true}$−z)) averaged over a batch of N examples ($z\hat{}_i$, $z_i$).

Ideal synthesized images $z\hat{}_i$ are not typically known a priori, which makes a direct supervised learning approach impractical. In some configurations, $z\hat{}$ can also be defined as a noise-free representation of the sharp-kernel image $x_{sharp}$. This means we can abstractly decompose $x_{sharp}$ as:

$$x_{sharp} = \hat{z} + \delta, \tag{3}$$

Where δ denotes the contribution from random noise in the imaging system. One solution to eq. (1) is then:

$$\Phi(x_{smooth}, x_{sharp}, \theta) = x_{sharp} - \delta = \hat{z}. \tag{4}$$

Eq. (4) phrases the image synthesis task as a denoising task for $x_{sharp}$.

Supervised learning using paired high-noise (x') and low-noise (x) images is effective for optimizing CNN models for such denoising tasks. In some configurations, the denoising CNN may be modeled as a parameterized function f(x; θ), with parameter values θ^ that satisfy:

$$f(x', \hat{\theta}) = x' - \delta = x. \tag{5}$$

The optimal parameters can be found by solving the minimization problem:

$$\hat{\theta} = \arg\min_{\theta} \mathbb{E}_{(x', x)}\{L(f(x', \theta), x)\}, \tag{6}$$

Where L denotes a scalar loss function such as the Frobenius norm of (x'−x).

Noise characteristics of the CT imaging system may be well-known, such that it is possible to simulate a representation of a CT image x with additional noise:

$$x'_{sharp} - x_{sharp} + \delta_{sim}, \tag{7}$$

where $\delta_{sim}$ denotes the contribution of additional simulated noise. An approximate solution to eq. (4) may be formed by solving a minimization problem of the form:

$$\hat{\theta} = \arg\min_{\theta} \mathbb{E}_{\left(x'_{smooth}, x'_{sharp}, x_{smooth}, x_{sharp}\right)}\{L(z, x_{smooth}, x_{sharp})\}, \tag{8}$$

for a suitable choice of the loss function L. The loss function can be decomposed into two separate terms:

$$L(z, x_{smooth}, x_{sharp}) = L_{sharp}(z, x_{sharp}) + L_{smooth}(z, x_{smooth}), \tag{9}$$

where the $L_{smooth}$ term constrains the low-contrast features in the synthesized image z to be similar to those of $x_{smooth}$; and $L_{sharp}$ constrains the small-scale features in z to be similar to $x_{sharp}$.

Figure 1B:
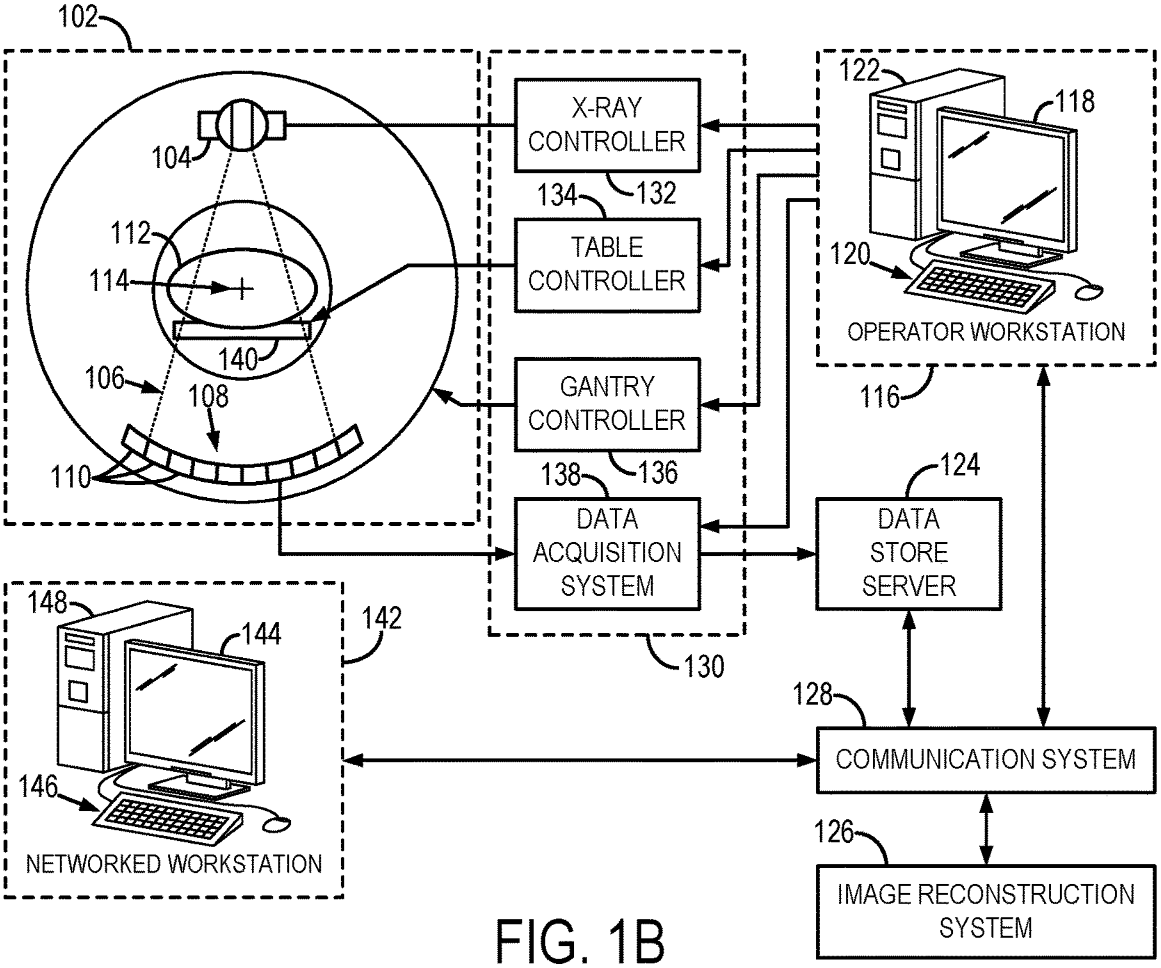
FIG. 1B is a schematic of one configuration for a system configured to operate the example CT system of FIG. 1A.

Referring particularly now to FIGS. 1A and 1B, an example of an x-ray computed tomography ("CT") imaging system 100 is illustrated. The CT system includes a gantry 102, to which at least one x-ray source 104 is coupled. The x-ray source 104 projects an x-ray beam 106, which may be a fan-beam or cone-beam of x-rays, towards a detector array 108 on the opposite side of the gantry 102. The detector array 108 includes a number of x-ray detector elements 110. Together, the x-ray detector elements 110 sense the projected x-rays 106 that pass through a subject 112, such as a medical patient or an object undergoing examination, that is positioned in the CT system 100. Each x-ray detector element 110 produces an electrical signal that may represent the intensity of an impinging x-ray beam and, hence, the attenuation of the beam as it passes through the subject 112. In some configurations, each x-ray detector 110 is capable of counting the number of x-ray photons that impinge upon the detector 110. In some configurations the system can include a second x-ray source and a second x-ray detector (not shown) operable at a different energy level than x-ray source 104 and detector 110. Any number of x-ray sources and corresponding x-ray detectors operable at different energies may be used, or a single x-ray source 104 may be operable to emit different energies that impinge upon detector 110. During a scan to acquire x-ray projection data, the gantry 102 and the components mounted thereon rotate about a center of rotation 114 located within the CT system 100.

The CT system 100 also includes an operator workstation 116, which typically includes a display 118; one or more input devices 120, such as a keyboard and mouse; and a computer processor 122. The computer processor 122 may include a commercially available programmable machine running a commercially available operating system. The operator workstation 116 provides the operator interface that enables scanning control parameters to be entered into the CT system 100. In general, the operator workstation 116 is in communication with a data store server 124 and an image reconstruction system 126. By way of example, the operator workstation 116, data store sever 124, and image reconstruction system 126 may be connected via a communication system 128, which may include any suitable network connection, whether wired, wireless, or a combination of both. As an example, the communication system 128 may include both proprietary or dedicated networks, as well as open networks, such as the internet.

The operator workstation 116 is also in communication with a control system 130 that controls operation of the CT system 100. The control system 130 generally includes an x-ray controller 132, a table controller 134, a gantry controller 136, and a data acquisition system 138. The x-ray controller 132 provides power and timing signals to the x-ray source 104 and the gantry controller 136 controls the rotational speed and position of the gantry 102. The table controller 134 controls a table 140 to position the subject 112 in the gantry 102 of the CT system 100.

The DAS 138 samples data from the detector elements 110 and converts the data to digital signals for subsequent processing. For instance, digitized x-ray data is communicated from the DAS 138 to the data store server 124. The image reconstruction system 126 then retrieves the x-ray data from the data store server 124 and reconstructs an image therefrom. The image reconstruction system 126 may include a commercially available computer processor, or may be a highly parallel computer architecture, such as a system that includes multiple-core processors and massively parallel, high-density computing devices. Optionally, image reconstruction can also be performed on the processor 122 in the operator workstation 116. Reconstructed images can then be communicated back to the data store server 124 for storage or to the operator workstation 116 to be displayed to the operator or clinician.

The CT system 100 may also include one or more networked workstations 142. By way of example, a networked workstation 142 may include a display 144; one or more input devices 146, such as a keyboard and mouse; and a processor 148. The networked workstation 142 may be located within the same facility as the operator workstation 116, or in a different facility, such as a different healthcare institution or clinic.

The networked workstation 142, whether within the same facility or in a different facility as the operator workstation 116, may gain remote access to the data store server 124 and/or the image reconstruction system 126 via the communication system 128. Accordingly, multiple networked workstations 142 may have access to the data store server 124 and/or image reconstruction system 126. In this manner, x-ray data, reconstructed images, or other data may be exchanged between the data store server 124, the image reconstruction system 126, and the networked workstations 142, such that the data or images may be remotely processed by a networked workstation 142. This data may be exchanged in any suitable format, such as in accordance with the transmission control protocol ("TCP"), the internet protocol ("IP"), or other known or suitable protocols.

Figure 2A:
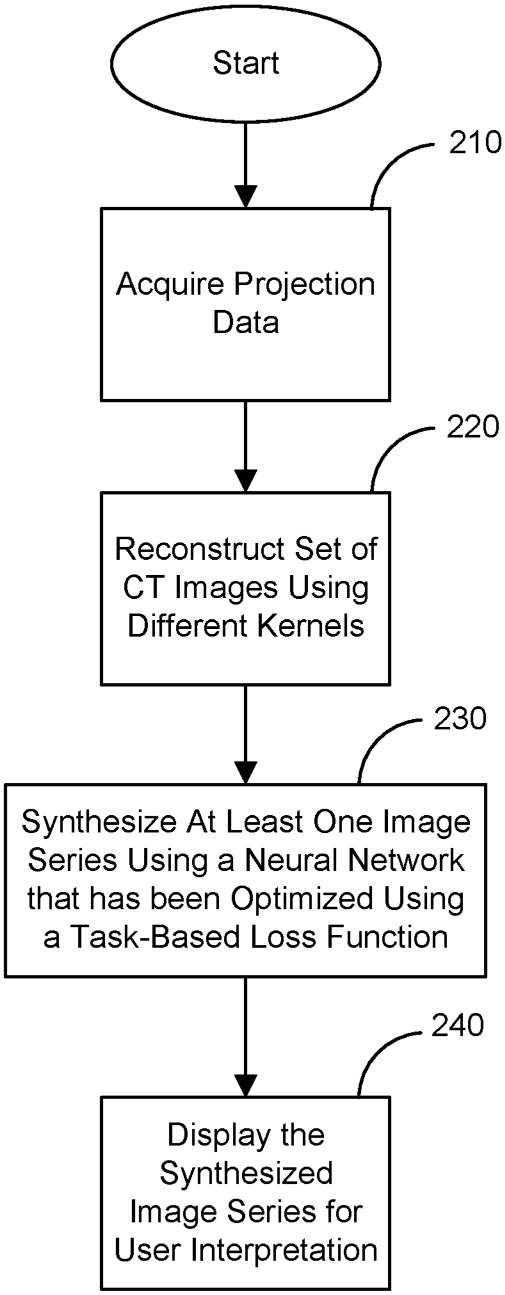
FIG. 2A is a flow chart setting forth some non-limiting examples of steps for a method for performing a multi-kernel synthesis in accordance with the present disclosure.

Referring to FIG. 2A, a flowchart setting forth some non-limiting examples of steps for performing a multi-kernel synthesis is shown. Beginning at step 210, raw projection data of a subject is acquired. This may include performing a CT scan of the subject or accessing previously-acquired or stored data. A set of CT images is reconstructed at step 220 where the images are reconstructed using different kernels. In some configurations of the multi-kernel synthesis method, the set of CT images may be fixed beforehand to span a range of spatial resolution and noise that may be synthesized according to the steps below. In some configurations, the set of CT images may be images that have been defined by a medical professional, such as a radiologist, that may be selected to represent a broad range of tissue types, such as soft tissues in one image and bones in another image in the set. In some configurations, the set of CT images may be images selected based upon case specific criteria, such as the need to visualize a certain region of interest, or to emphasize contrast between regions of interest. In some configurations, the set of CT images may be reconstructed using different image kernels that may be determined based upon desired contrast to noise ratio, signal to noise ratio, dose level, and the like. At step 230, the set of CT images may be applied to a neural network that synthesizes a single image series, or a selected number of synthesized images, from the original fixed set of images. It is a teaching of the present disclosure that this neural network can be optimized by using a task-based loss function. As described above, this task-based loss function includes two terms that parameterize training of the neural network: a sharp loss function term that entrains similarity with a full dose sharp kernel image and a smooth loss function term that entrains similarity with a full dose smooth kernel image after a kernel conversion of the model output. At step 240, a synthesized image or images may be displayed for a user, such as a radiologist, for interpretation. The synthesized image or images may also be stored in a computer archive for future use.

In some configurations, a network training procedure may determine how the input image features should be merged to produce an optimal output image. The optimization may be performed to create a single image series where different kernels have been mixed together to emphasize certain features or regions of interest in an image, such as mixing a soft kernel and a sharp kernel to form an optimized single image. In some configurations, an optimization may be performed using deep learning methods to model a function that combines image features in a way that is desirable with regards to a specified loss function. In some configurations, the synthesized image may be a single image and may be a combination of the best image qualities of multiple kernels. Image qualities may include spatial resolution, contrast-to-noise ratio, and signal-to-noise ratio.

In some configurations, the method used to generate data to train the neural network includes supervised learning. In order to use supervised learning, a training dataset may be generated that includes input images, each paired with the desired output. Since the desired output, such as a map of the X-ray attenuation coefficients of the imaged object, may be unknown, and the input CT images may be an approximation of this quantity, generating a useful training dataset may not be a simple task. In some configurations to create a dataset, the input images may be degraded by artificially inserting CT image noise, thereby allowing the original CT images to be used as examples of superior image quality. After the neural network has been trained to combine the input images in a desired way, it can then be applied to unaltered clinical images.

In general, training a neural network may include initializing the neural network, such as by computing, estimating, or otherwise selecting initial network parameters (e.g., weights, biases, or both). Training data can then be input to the initialized neural network, generating model output data (e.g., synthesized image series data). The quality of the model output data can then be evaluated, such as by passing the model output data to a loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. When the error has been minimized (e.g., by determining whether an error threshold or other stopping criterion has been satisfied), the current neural network and its associated network parameters represent the trained neural network.

As described above, it is an aspect of the present disclosure that a task-based loss function can be used when training the neural network for multi-kernel synthesis. This task-based loss function includes two complementary terms: a sharp loss term and a smooth loss term. As will be described below, the sharp loss term can be applied to the model output data (e.g., synthesized image series data) while the smooth loss term is applied to the model output data after domain conversion.

Figure 2B:
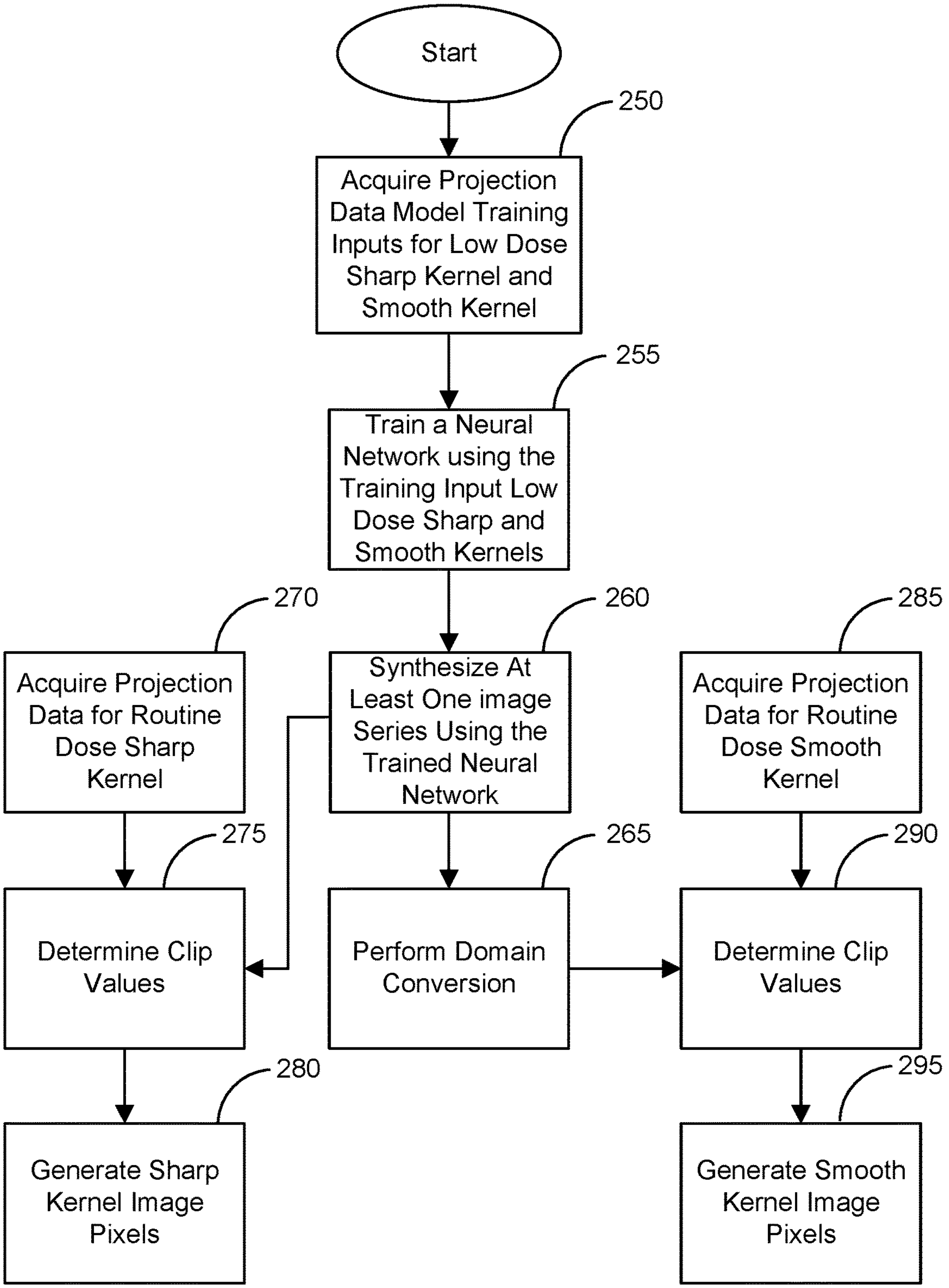
FIG. 2B is a flow chart setting forth some non-limiting examples of steps for a training method in accordance with the present disclosure.

Referring to FIG. 2B, a flow chart setting forth some non-limiting examples of steps for a task-based loss training method in accordance with the present disclosure is shown. Projection data for model training input may be accessed or acquired at step 250 for low-dose sharp kernels and low-dose smooth kernels. A neural network, such as a convolutional neural network, which may implement a U-Net architecture in some embodiments, and the like, may be trained using the training input low dose sharp and smooth kernels at step 255. At least one image series using the currently trained neural network may be synthesized at step 260 as model output data. Domain conversion may be performed at step 265 before applying the model output data to the smooth loss term. Domain conversion may provide for smoothing pixel values. Projection data for a routine dose sharp kernel may be accessed or acquired at step 270, and clip values may be determined for the sharp kernel at step 275. Clip values may include determining a range of HU for the pixels, and excluding pixels that are outside of the desired HU range. Sharp kernel image pixels may be generated at step 280. Projection data for a routine dose smooth kernel may be accessed or acquired at step 285. Clip values for the smooth kernel may be determined at step 290, and smooth kernel image pixels may be generated at step 295. As described above, the training process is iterated to minimize the loss as calculated with the task-based loss function. The resulting network parameters can be stored as the trained neural network parameters.

As one example, the task-based loss function may be expressed as:

$$L(\hat{y}) = \sum(y_{sharp} - \hat{y})^2 + \beta \cdot \sum(y_{smooth} - \hat{y} * g)^2 + \gamma \cdot TV(\hat{y})$$

Here ŷ is the model output, $y_{sharp}$, and $y_{smooth}$ are the respective routine dose target kernel images, ŷ*g indicates the filtering operation smoothing the model output during training, and TV(ŷ) is an additional total variation regularization term that can be added to further control the overall noise level.

To model the kernel synthesis mapping $\Phi(x_{sharp}; x_{smooth}) = z$, a residual U-Net architecture characterized for its image-to-image applications may be used. The network dimensions may be adjusted to reduce the receptive field while maintaining the model capacity in terms of trainable parameters. In a non-limiting example, the depth of the U-Net in terms of the number of down-sampling blocks may be reduced from 5 to 2, which reduces the receptive field and reflects the more localized nature of the kernel synthesis relative to, for example, organ segmentation. To maintain model capacity, the width of the U-Net, in terms of the number of convolutional filters at each layer, may be increased. In a non-limiting example, a base of 256 filters may be used, whereas conventional U-Net systems typically have a base of 64 filters.

A decomposition of the loss function (Eq. 9) into specific loss terms ($L_{sharp}$, $L_{smooth}$) for each image series ($x_{sharp}$, $x_{smooth}$) may provide for tailoring of each term to train a model whose output is a single image series possessing the favorable image quality properties of each input for the given task. In a non-limiting example for head trauma, $x_{sharp}$ may emphasize high spatial frequencies used for visualizing the bones of the skull while being of limited use in the brain. $L_{sharp}$ may be formed to penalize differences between a model output ẑ and full dose sharp kernel target $x_{sharp}$ in the pixel locations $\vec{r}$ covering the skull, referred to as the sharp domain $D_{sharp}$:

$$L_{sharp} = \alpha \left\| \hat{z}(\vec{r}) - x_{sharp}(\vec{r}) \right\|_2, \text{ for } \vec{r} \in \mathcal{D}_{sharp}, \tag{10}$$

where $\|\cdot\|_2$ is the L2 norm and a is a scalar hyperparameter controlling the relative influence of $L_{sharp}$ in eq. (9). $x_{smooth}$ may be optimized for low-contrast imaging tasks, such as those inside the brain, utilizing a low-pass kernel that reduces image noise and a specialized non-linear gray level remapping used to enhance gray-matter and white-matter contrast in the brain, referred to as multi-band filtration. A sharp kernel acquired with exceptionally high dose may be used to match the low noise of a smooth kernel, but would still lack the enhanced gray-white matter contrast of the clinical kernel. In a non-limiting example for the brain, a low-noise smooth kernel $x_{smooth}$ may be desired for training purposes. A smooth kernel may, however, suffer from the loss in spatial resolution. To address loss in spatial resolution $L_{smooth}$ may incorporate a smoothing of the model output to match the spatial resolution of $x_{smooth}$ prior to computing the $L_2$ norm, a process called kernel conversion $C(\hat{z}(\vec{r}),\sigma)$. The kernel conversion process may be part of $L_{smooth}$ as follows:

$$L_{smooth} = \beta \left\| C(\hat{z}(\vec{r}), \sigma) - x_{smooth}(\vec{r}) \right\|_2 + \gamma TV(\hat{z}(\vec{r})), \text{ for } \vec{r} \in \mathcal{D}_{smooth}. \tag{11}$$

Here kernel conversion filters the model output with a fixed isotropic gaussian kernel $$C(x, \sigma) = x * g(\sigma) \text{ where } g(u, v) = \frac{1}{\sqrt{2\pi\sigma}} \epsilon^{-(u^2+v^2)/2\sigma^2}$$

whose only parameter is the gaussian width σ. σ may be determined by:

$$\hat{\sigma} = \underset{\sigma}{\operatorname{argmin}} \| C(x_{sharp}, \sigma) - x_{smooth} \|_2, \tag{12}$$

And may be based upon the combination of sharp and smooth image data, $x_{sharp}$ and $x_{smooth}$, respectively. In a non-limiting example (Table 2) it was found σ=0:47 mm. A total variation (TV) regularizer may be added to control the overall noise level of the model output within the region of interest, such as the brain ($D_{smooth}$) with hyperparameter γ.

The domains D in which loss functions take effect can be practically thought of as masks determined via segmentation. In cases of large HU differences between the anatomic regions of interest, such as in some forms of head imaging tasks given the bones and soft tissue, this mask can be found by intensity thresholding. Thresholds may be based upon typical settings, such as brain display settings. In a non-limiting example, thresholds may be selected as:

$$\mathcal{D}_{smooth} = \begin{cases} 1 & \hat{z} \geq 0\ HU, \hat{z} \leq 80\ HU \\ 0 & \text{else} \end{cases}$$

$$\mathcal{D}_{sharp} = \begin{cases} 1 & \hat{z} < 0\ HU, \hat{z} > 80\ HU \\ 0 & \text{else} \end{cases}$$

In some configurations, in order to ensure a smooth transition between domains a windowing function may be used with a cubic weighted distance function.

The image quality tasks may be defined by the loss terms Eq. (10) and Eq. (11), which are parameterized by α, β, and γ. These hyperparameters control image sharpness, soft tissue contrast enhancement, and noise level within the region of interest, such as the brain, respectively and are combined in Eq. (8) to define the total loss. The specific values of these hyperparameters may depend upon the combination of input kernels and relative priority of each image quality task. Hyperparameters may be chosen with expert reader feedback using a validation set to balance noise reduction in the region of interest, such as the brain while maintaining suitable image texture and preserving sharpness, such as in the skull. Non-limiting example hyperparameters for a brain imaging application are summarized in Table 1. Model parameters may be optimized using an optimizer, such as an ADAM optimizer, and a stepwise decreasing learning rate n may be used. In a non-limiting example, a stepwise learning rate may be selected to decrease by a set threshold, such as by a third over three equidistant steps covering the total number of training epochs.

TABLE 1

Hyperparameters used for model training.

| hyperparameter | α | β | γ | max learning rate | Batch size | epochs |
|---|---|---|---|---|---|---|
| value | 0.5 | 7 | 1e–5 | 1e–4 | 64 | 200 |

In some configurations, an edge enhancement may be used. High-contrast anatomical details from the sharp kernel may be further enhanced in the synthesized output. In a non-limiting example, despite having the same cutoff frequency as the clinical reference Hr69 kernel, a Qr69 kernel used in model training (Table 2) lacked a pre-processed edge enhancement native to the clinical reference kernel, making Qr69 appear visually less sharp. Using Hr69 as the sharp training kernel revealed artifacts in the model output when viewed with brain display settings. These included boundary discontinuity artifacts at the brain-skull interface and unsatisfactory noise texture within the brain and were due to the undesired edge enhancement of Hr69 and lack of beam hardening correction. While beam hardening corrections were not available in sharp kernels directly on the scanner, they were available on offline reconstruction systems. In some configurations, beam hardening may be incorporated as an additional learning task by utilizing beam hardening corrected images as training targets in both smooth and sharp targets. Such corrections are shown in a non-limiting example in Table 2. To address reduced apparent sharpness in the bone from the Qr69 kernel, the highly attenuating skull regions from the sharp kernel image were edge-enhanced using an un-sharp mask filter that best maps the Qr69 kernel to Hr69 and added as a weighted sum with the model output:

$$\hat{z}' = x'_{sharp}\delta + \hat{z}(1-\delta) \tag{13}$$

where δ is the windowed mask representing $D_{sharp}$.

Figure 3:
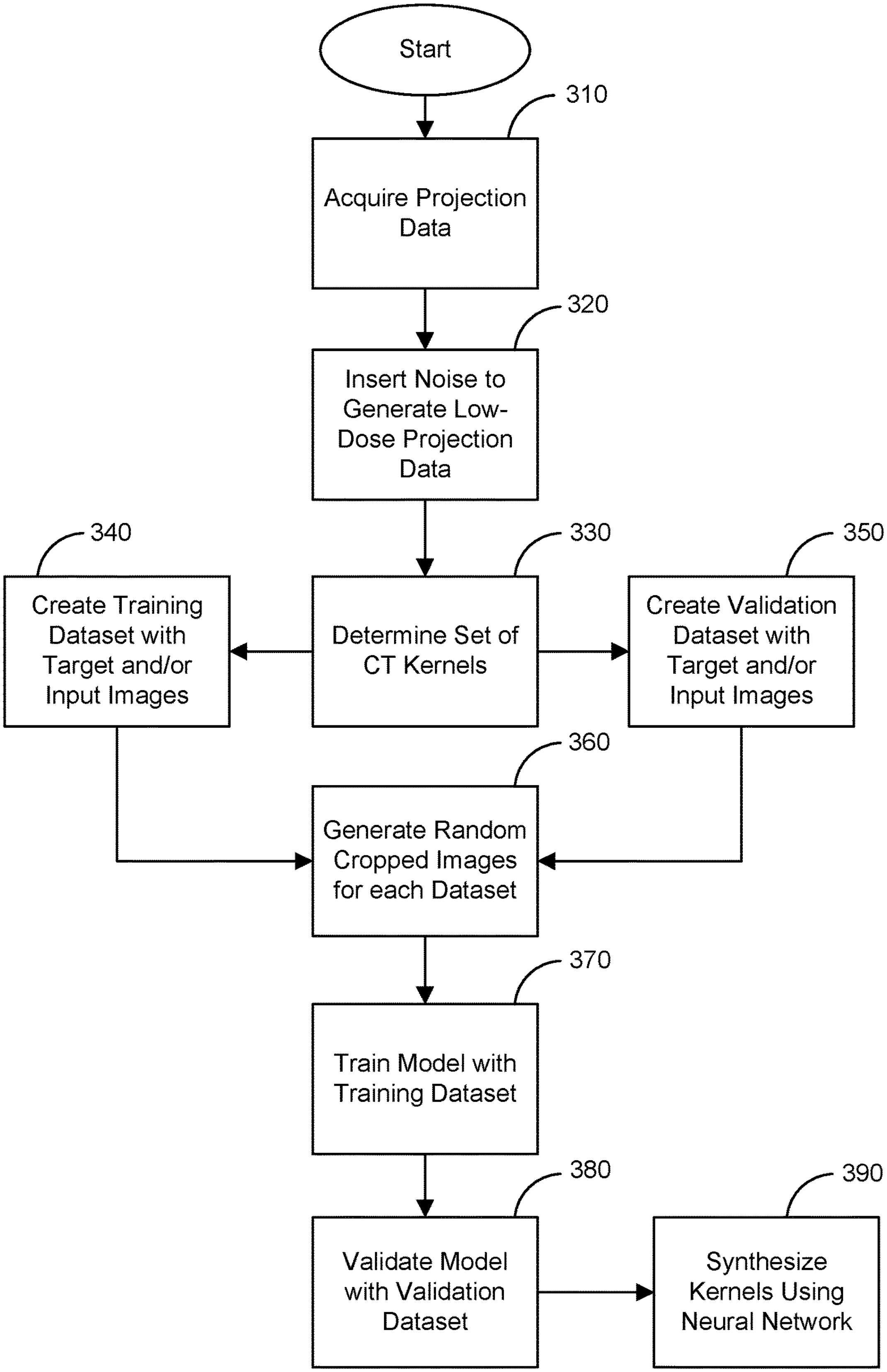
FIG. 3 is another flow chart setting forth some non-limiting examples of steps for a training method in accordance with the present disclosure.

Referring to FIG. 3, one configuration for a training procedure for a neural network configured to perform kernel synthesis is shown. CT scan projection data is acquired at step 310. Again, this data may be acquired by performing an imaging process or by accessing stored data. The acquired projection data, preferably, has a desirable signal-to-noise ratio, such as may be achieved using a "full dose" of radiation when acquiring the data. By inserting noise into the data, a low-dose projection dataset may be generated at step 320. A set of CT kernels may be determined at step 330. A training dataset may be created at step 340 and contain target images and/or input images. A validation set may be created at step 350 and contain target images and/or input images. Target images may be formed of regions of interest of a subject depicting disease, pathology, or any other area of interest in a specified kernel, and may be full-dose images, reduced dose images, simulated images, such as simulated quarter-dose CT images, or other lower dose images, and the like. Input images may be any arbitrarily-sized stack of images with a number of adjacent slices in the channel dimension, and may be the full-dose or other high-signal-to-noise-ratio images, reduced dose images, simulated images, such as simulated quarter-dose CT images, or other lower dose images, and the like. Random cropped images may be generated for the training dataset and the validation dataset at step 360. A neural network model may then be trained at step 370 with the training dataset. The trained neural network model may be validated by comparing results with the validation dataset at step 380. Synthesized kernels may be created using the trained neural network at step 390, and the trained neural network may be used in a process according to FIG. 2.

Figure 4:
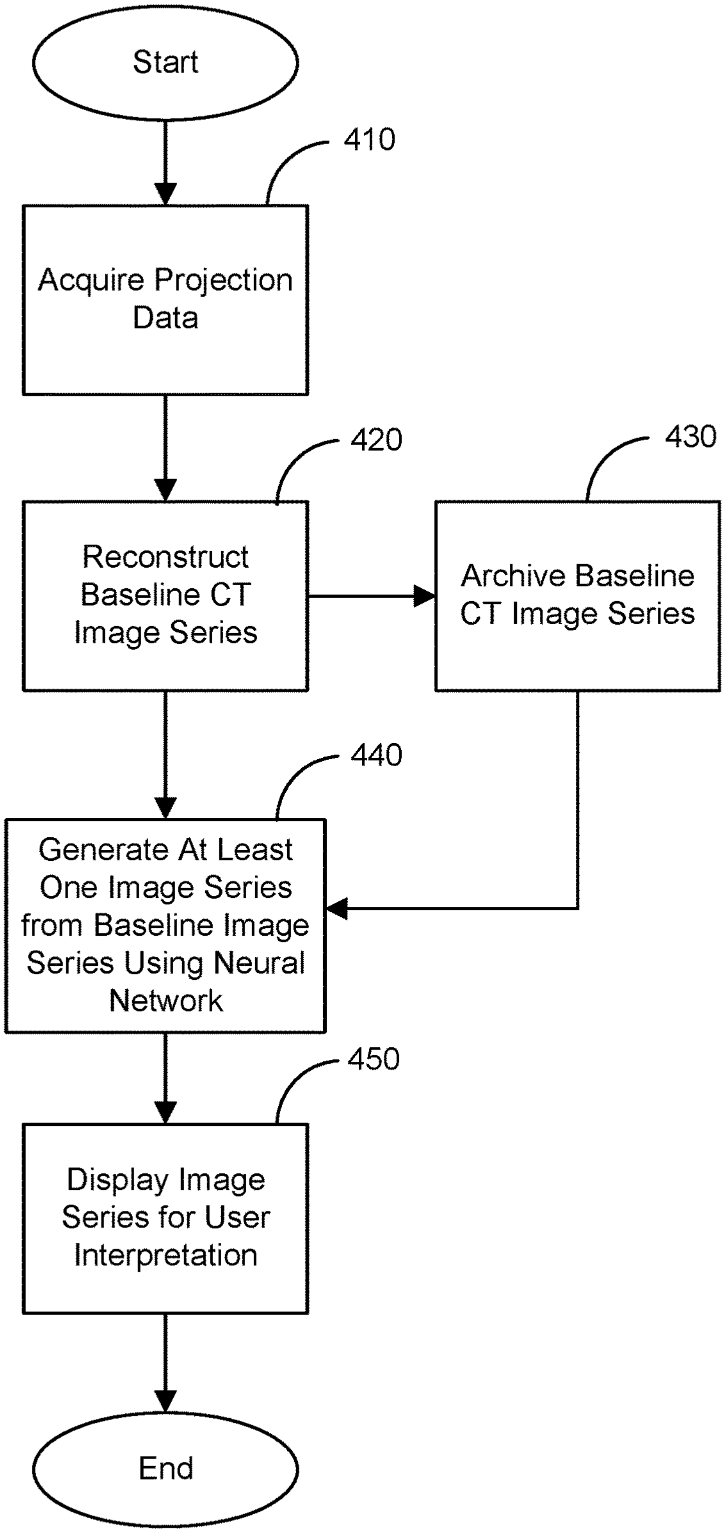
FIG. 4 is yet another flow chart setting forth some non-limiting examples of steps for a method of generating image series with arbitrary kernels from one single baseline image series in accordance with the present disclosure.

Referring to FIG. 4, a flowchart is shown for one configuration of generating image series at multiple kernels from a single baseline CT image series. A raw projection data is acquired at step 410. This may be achieved by performing a CT imaging scan or by accessing stored data. A baseline CT image or image series is reconstructed at 420, and may be stored in a long-term archival system at step 430. This baseline image or image series may be used to provide a basis upon which other images may be generated without needing to retain the original raw projection data. In one configuration, the baseline CT image series is a sharp kernel with a thin slice thickness (such as the sharpest the system can provide), which is assumed to retain most, if not all, of the information in the acquired data. Image series of new kernels may be generated at step 440 based on this baseline image series as needed. The generated image series may then be displayed for a user at step 450 according to specific exam protocols.

In some configurations, the baseline image is a single image reconstruction and may be in the sharpest possible spatial resolution that is determined by the data acquisition and in a sufficiently large matrix size to avoid aliasing. In some configurations, the spatial resolution can be lower than these limits and the matrix size can be smaller to save storage space, provided that all the clinically required kernels can still be generated by this one single image series.

In current clinical workflows, many reconstruction jobs are needed to be done on the scanner by the image reconstruction system (IRS). Often, some of the reconstructions or reformats need to be manually performed by the technologists before sending to the PACS or long-term archival systems. This workflow is an inefficient use of scanner and technologist time, especially in a busy working environment. The process described with respect to FIG. 4 provides one method for improving clinical workflow using a deep learning-based method. In one configuration, the scanner reconstructs and archives only one single image series from the CT projection data. A deep learning-based neural network system, together with other image processing methods, may be employed to generate image series at other spatial resolutions, slice thicknesses, and 3D reformatted planes. This may substantially increase the efficiency of scanner utilization and technologist time, reduce the burden on the archival system, and simplify the clinical workflow.

In some configurations, various image series of different kernels can either be generated in real time based on the request from the human reader or pre-generated based on a specific protocol for the diagnostic task and loaded on an image storage system, such as the PACS, or other image viewers for diagnosis. In one non-limiting example, the list of reconstruction jobs can be pre-generated on the workstation by the CNN (and 3D reformat tool) and displayed automatically after the exam is loaded for diagnosis. Additional kernels can be generated as requested, which may be much faster than image reconstructions performed from raw data. Generating various image series of different kernels may not require vendor-specific software.

In some configurations, the neural network is trained prior to being used to generate new image series of different kernels. During the training of the network, the training images can be at a higher dose so that the neural network can be trained to generate a new image series with a noise reduction effect.

In some configurations, the newly generated image output of the neural network at step 440 of FIG. 4 may not need to mimic exactly an existing kernel. New image series with a tradeoff between spatial resolution and noise that is different from existing kernels can also be generated, such as by simulating an image created from a blend of kernels. This may also offer the opportunity of creating vendor neutral kernels from different scanner makes and models.

Figure 5A:
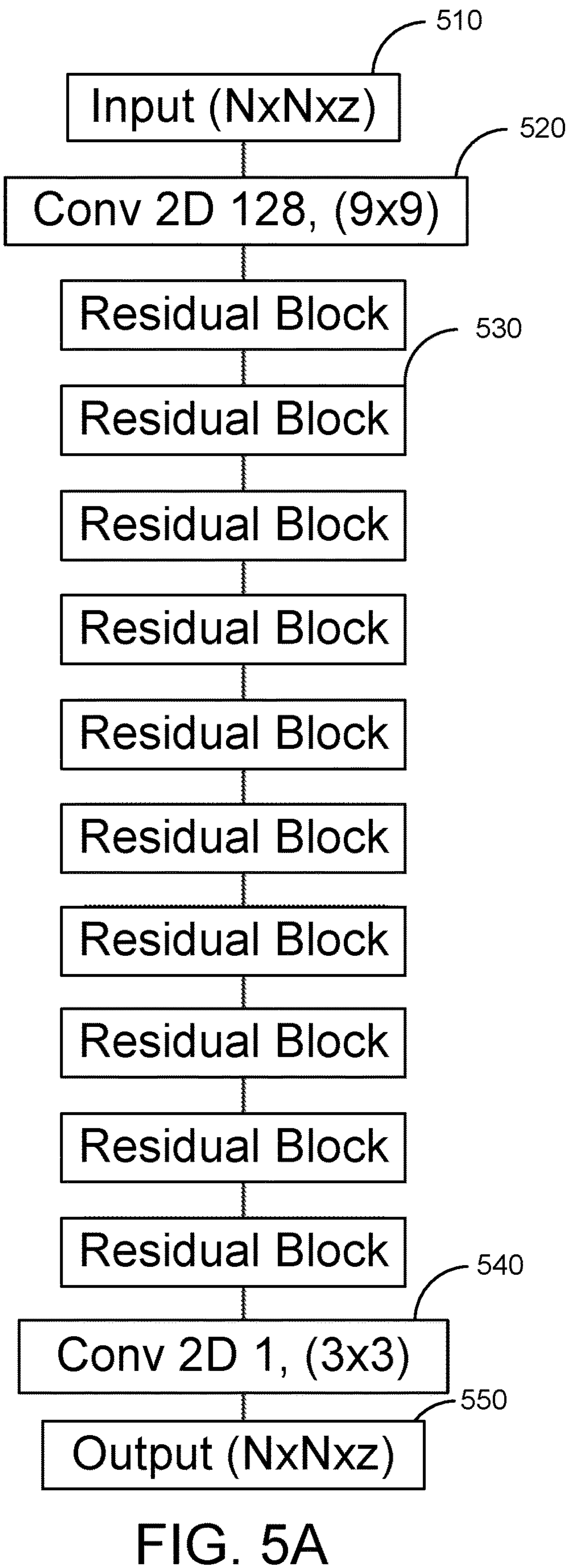
FIG. 5A is a schematic diagram of one example of a convolutional neural network architecture in accordance with the present disclosure.

Referring to FIG. 5A, one non-limiting example convolutional neural network architecture is shown. An input image 510 may be any arbitrarily-sized stack of images, with a fixed number of adjacent slices in the channel dimension. In one non-limiting example, the input image 510 is a sharp kernel. In some configurations, the input image 510 may be three arbitrarily-shaped images, each from a different reconstruction kernel, stacked in the channel dimension. A convolution layer 520 may be one of a plurality of layers, such as one of a 32 layer convolutional neural network. A residual block 530 may be one of a plurality of blocks, such as 10 blocks in one non-limiting example, containing a plurality of convolutional layers and filters, and are detailed below. A final convolution layer 540 may perform a final process before generating an output 550. The output 550 may be a single-channel image that can be identified as a perturbative correction for the input image, such as the sharpest kernel. In some configurations, the input image 510 may be subjected to a convolutional neural network where a predicted noise correction is determined so that noise can be subtracted from a network processed image to create an output image 550, which may then be compared to a full-dose reference.

Figure 5B:
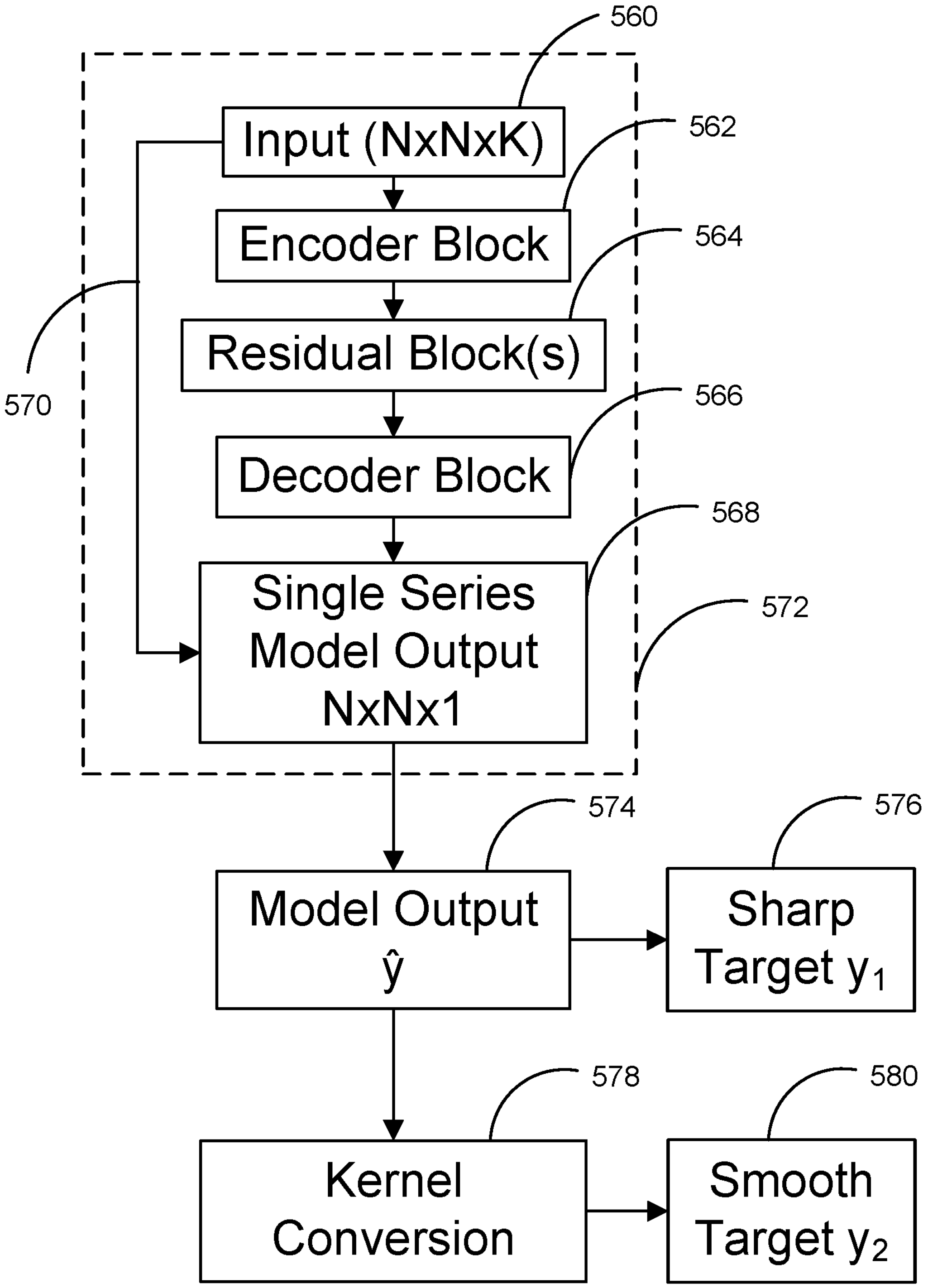
FIG. 5B is another schematic diagram of one example of a convolutional neural network architecture in accordance with the present disclosure

Referring to FIG. 5B, another non-limiting example convolutional neural network architecture is shown for training sharp and smooth models. An input image 560 may be introduced to model 572. Input image 560 may be any arbitrarily-sized stack of images, with a fixed number of adjacent slices in the channel dimension. In some configurations, the input image 560 may be a plurality of arbitrarily-shaped images, each from a different reconstruction kernel, stacked in the channel dimension. Encoder block 562 may be configured to receive the input image 560 to provide for encoding and preparation for residual block or blocks 564. A residual block(s) 564 may be one of a plurality of blocks containing a plurality of convolutional layers and filters, non-limiting examples of which are detailed below. Decoder block 566 may provide for decoding of the processed images from residual blocks 564. The single series model output 568 may be a single-channel image that can be identified as a perturbative correction for the input image. In some configurations, the sharpest kernel 570 may be provided a single series model output 568. Model output $\hat{y}$ 574 may be used to produce a sharp kernel target $y_1$ 576. Kernel conversion 578 may be used to produce smooth kernel target $y_2$ 580.

In a non-limiting example brain application, task-based loss function $L_{task}$ may combine loss terms appropriate to the sharp and smooth kernels, $L_{sharp}$, and $L_{smooth}$ by:

$$eL_{task} = \lambda_1 L_{sharp} + \lambda_2 L_{smooth}$$

$$L_{sharp} = \begin{cases} \|\hat{y} - y_1\|_2, & y_2 \leq 0 \text{ or } y_2 > 80 \\ 0, & 0 < y_2 \leq 80 \end{cases}$$

-continued $$L_{smooth}(\lambda_{TV}) = \begin{cases} \|C(\hat{y}) - y_2\|_2 + \lambda_{TV} V(\hat{y}), & 0 < y_2 \leq 80 \\ 0, & y_2 \leq 0 \text{ or } y_2 > 80 \end{cases}$$

The task-based loss function may include two loss functions that control the local image quality. $L_{smooth}$ enforces similarity with the smooth image target $y_2$, such as in the HU range given, which is typical of brain. $L_{sharp}$ enforces similarity with the sharp target, such as outside the brain HU range while penalizing sharp kernel noise within the brain HU range.

In some configurations, a U-Net CNN architecture may be used with sharp and smooth kernel inputs. A baseline model may be trained using a mean-squared-error (MSE) loss function. A second model may then be trained under the same conditions using a task-based loss function $L_{task}$ which combines loss terms appropriate to the sharp and smooth kernels, $L_{sharp}$, and $L_{smooth}$. The $L_{sharp}$ loss function penalizes noise from the sharp kernel images using total variation loss V. For all other HUS, $L_{sharp}$ enforces similarity with the sharp kernel image target $y_1$. Similarly, the $L_{smooth}$ loss function enforces similarity with the smooth kernel image target $y_2$ desired HU values. Additionally, a kernel conversion C may be applied to the model output as a precalculated fixed-width Gaussian convolution that approximates the mapping from the sharp to the smooth kernel. The kernel conversion of the model output may provide for better similarity comparisons with the smooth target and improved training performance.

Figure 6:
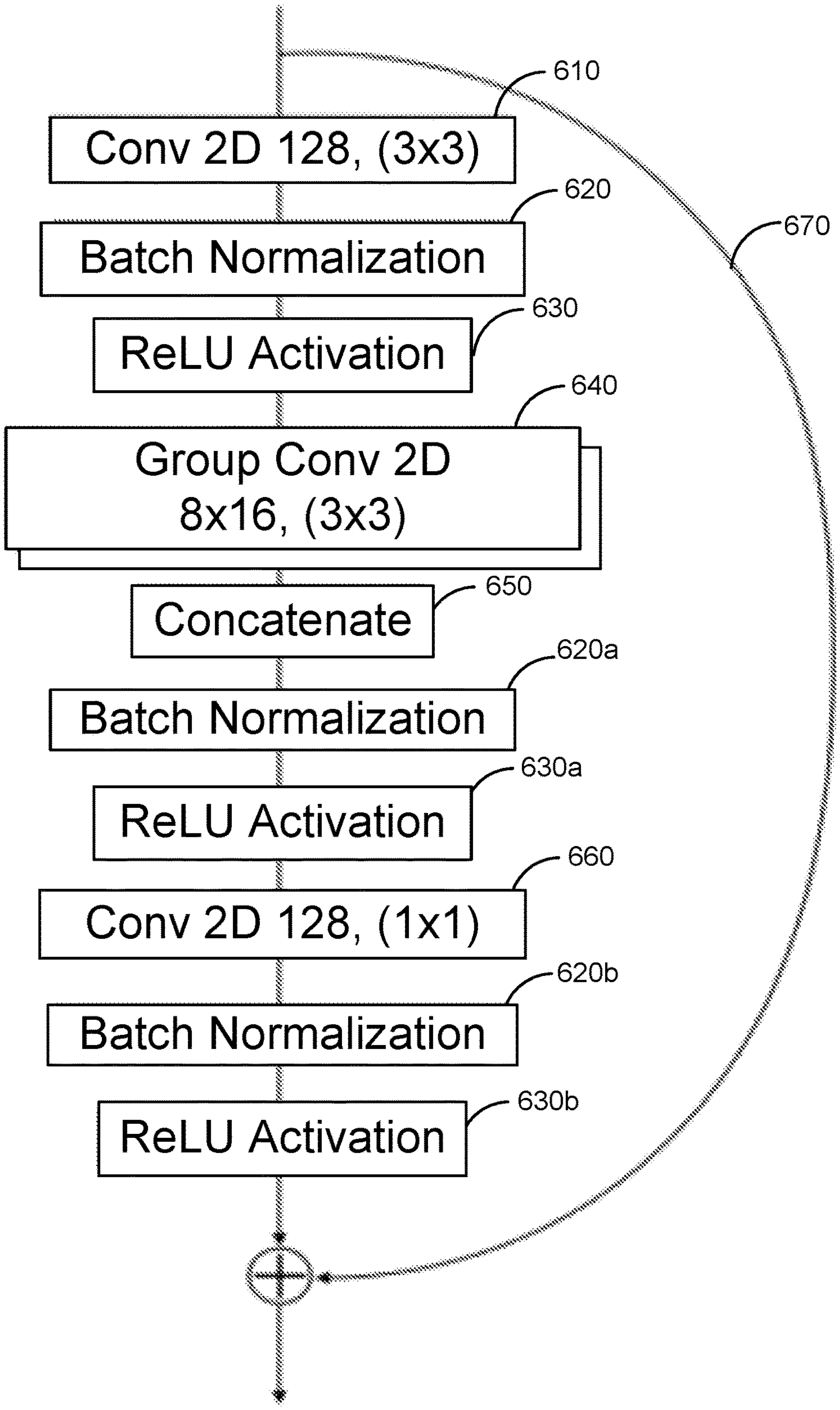
FIG. 6 is a schematic diagram of a residual block structure in accordance with the present disclosure.

Referring to FIG. 6, an example of a residual block structure from FIG. 5A or FIG. 5B is shown in detail. An example residual block may include multiple convolutional layers with multiple filters each. In one, non-limiting example, 3 convolutional layers having 128 filters each may be used. A convolutional layer 610 may be followed by a batch normalization process 620. An activation function 630, such as a rectified linear unit (ReLU) activation function, may be used to determine when a feature is considered to be significant. A second convolutional layer 640 may be one of a plurality of convolutional procedures. Data may be consolidated with concatenation 650. A final convolution layer 660 may then project back into the image domain. The specific number of convolutional layers may vary between implementations. Following each convolutional layer, respective batch normalizations 620*a*, 620*b* and activations 630*a*, 630*b* may be included. A bypass 670 indicates that a particular residual block may be skipped if the appropriate criteria are met. To preserve spatial resolution, no pooling or other downsampling operations were used.

Execution time may vary depending on hardware and the exact CNN architecture used. In some configurations, an easier kernel conversion may be able to use a smaller CNN (fewer residual blocks). In one non-limiting example, time to process a single scan slice was 0.17 sec. for kernel synthesis and 0.02 sec.-0.17 sec. for kernel conversion using commercially available graphical processing unit (GPU) hardware. A CNN may be implemented in any appropriate coding language, such as Python, and may be trained using any appropriate tools, including open-source tools (such as Tensorflow) and standard Python scientific computing packages. CNN architecture may be selected to be similar to image classification networks (such as ResNet), for ease of commercial deployment.

Example Multi-Kernel Synthesis

In one non-limiting example, simulated quarter-dose images obtained from different kernels were used as the network input, and the corresponding full-dose images reconstructed with the sharp kernel were used as the ground truth to evaluate a mean-squared-error loss function. The network was trained on 500,000 example images of various sizes that were cropped from ten abdominal CT exams. After training, the performance was evaluated by comparing input and output images using a reserved set of full-dose abdominal, chest, and phantom CT scans that were not used in the network training.

Images were combined from three input kernels: a very sharp kernel (e.g., Siemens B70), a very smooth (e.g., Siemens B10), and an intermediate kernel (e.g., Siemens B45). The resultant images maintain the sharp edges and fine anatomical details of the sharpest input kernel, while also exhibiting the low noise characteristics and maintaining the ability to identify subtle anatomical details of the smooth kernels. For images acquired with low dose level (one quarter of clinical dose), the signal-to-noise ratio of in the sharp kernel images is increased by over 200%, thereby potentially making these images clinically useful. Different tissues that require specific kernels for optimal viewing, such as bones, liver and lungs, all appear to have satisfactory quality in the resultant image. Furthermore, the images are devoid of any artificial textures that detract from the natural appearance of the images.

The synthetic images in the current example improved the signal-to-noise ratio by 338% compared to the sharp kernel images, without observable blurring of sharp edges. Despite the increased smoothness, the synthesized image maintains many of the sharp features and fine details contained in the sharpest input images. The synthesized images also appear natural, with no perceptible artificial texture introduced that detracted from the natural appearance of the synthetic image. The algorithm was robust enough to be applied to multiple tissue types, including the bones, lungs, and liver.

Example Kernel Conversion from a Single Baseline Image Series

In one non-limiting example of how a deep learning-based method can be used to generate multiple reconstruction kernels from a single high-resolution baseline image series, a deep CNN was trained using supervised learning on clinical CT images reconstructed with the sharpest available kernel (an S80 kernel on a Siemens Flash scanner) with thin slices (0.6 mm) to preserve information acquired in the raw data, as inputs. Using a very sharp kernel ensures that all useful information from the data acquisition is included in the input image series.

Three commonly-used body CT target kernels were generated with a CNN approach: a smooth kernel (B30), medium-sharp kernel (B46), and sharp kernel (B70). A separate CNN training was performed for each kernel. For each kernel, the full training dataset consisted of 250,000 paired 64×64 pixel images randomly cropped from the base kernel images and target kernel images. A supervised learning approach was used, with the loss function defined as the mean squared error (MSE) between the CNN-generated kernel image and the truly reconstructed target kernel image. The CNN was implemented with Tensorflow. The approach was tested on a reserved set of 20 clinical patient scans that were not used for network training. Accuracy of the approach was determined by subtracting the simulated kernel images from the target kernel images. Additionally, the mean absolute error was calculated on a pixel by pixel basis for each case.

After training for 100 epochs, the result was tested on a patient scan not included in the training data. The CNN simulates the appearance of other kernels to an almost imperceptible level of accuracy. The mean absolute difference between the images generated with the trained CNN and the actually reconstructed images was 2.0 HU for the B30 kernel, and 3.1 HU for the B46 kernel. Any reconstruction kernels can be generated, including iterative reconstruction. By training with high-dose image series, noise reduction effect can be inherently included in the kernel conversion. By converting baseline image series to images reconstructed with iterative reconstruction, similar image quality improvement as by iterative reconstruction may be achieved. Artifact correction may have already been implemented in the baseline image series.

Non-Limiting Example Individualized Denoising

Figure 7:
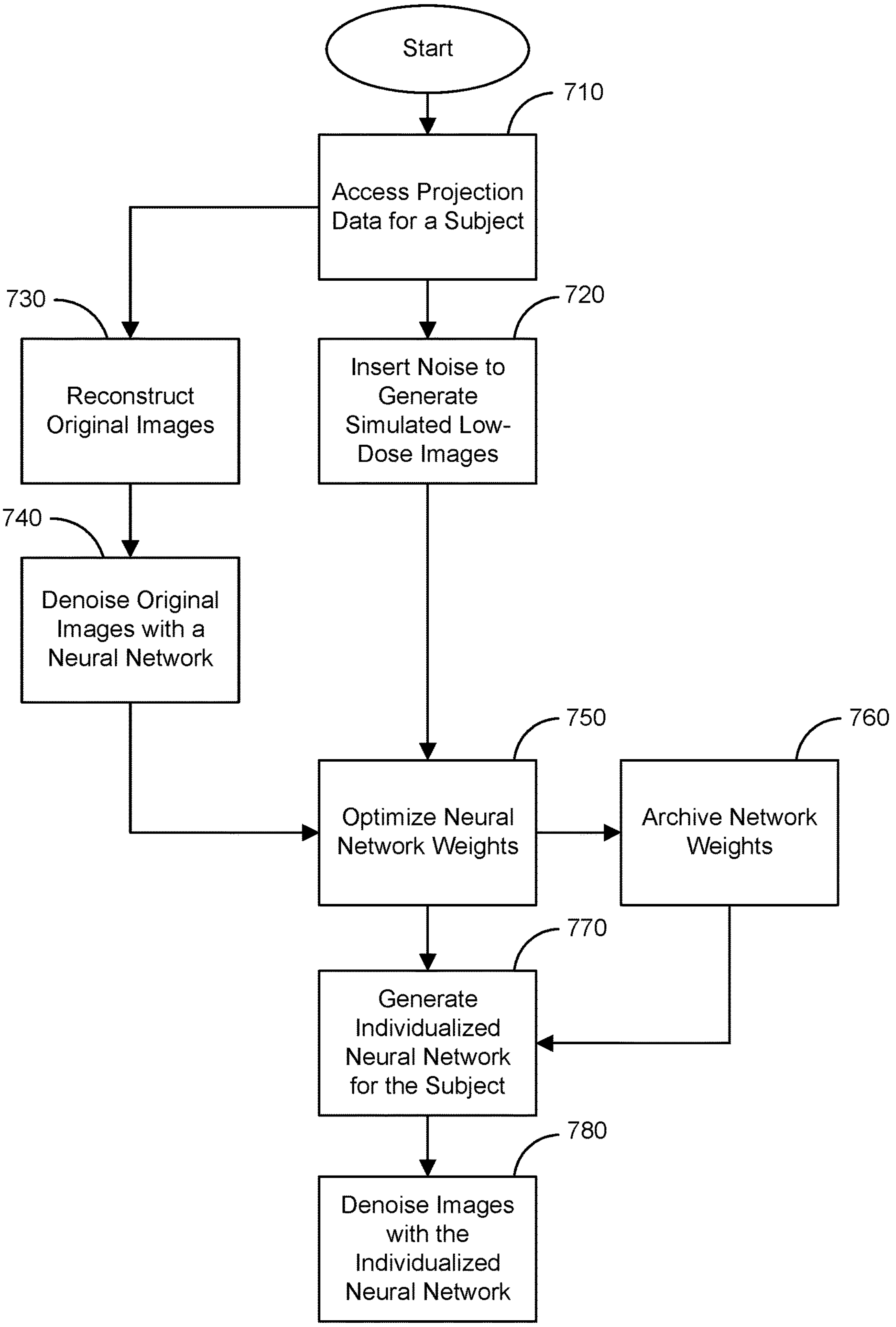
FIG. 7 is a flow chart setting forth some non-limiting example steps for individualized image denoising in accordance with the present disclosure.

Referring to FIG. 7, non-limiting example steps for individualized image denoising are shown, which may be used with the present disclosure. Raw image data, such as CT projection data, may be acquired or accessed at step 710. Noise may be introduced to the data as described above to generate simulated low-dose images at step 720. Original images that do not include introduced noise may be reconstructed at step 730. These original images may be denoised with a neural network at step 740. Neural network weights, such as weights for a CNN, may be optimized at step 750 using the simulated low-dose images as described above, or the original images, or a combination of both, such as during a comparison of the images. The neural network weights in step 750 may be archived at step 760, such as for future use, reference, review, and the like. A neural network that may be optimized specifically for the individual subject may be generated at step 770 using the weights from step 750, or those archived at step 760. In some configurations, the neural network used in step 770 may be a different neural network than that used in step 740. Denoised images with the individualized neural network may be generated at step 780.

Non-limiting Example for Head Trauma

A dataset consisting of CT images of patients with suspected head trauma was collected to demonstrate clinical utility. Head trauma CT was chosen since the clinical task involves both low-contrast (hemorrhage, infarction), and high-resolution (skull fracture) image features. The protocols for head trauma cases are typically very complex and require multiple reconstructed image series with different kernels and slice thicknesses, such that the potential value of having a single low-noise and high-resolution image series is high. Clinical examples of suspected head trauma were collected under a protocol approved by the Institutional Review Board. Inclusion criteria considered patients who underwent head CT exams in the emergency department for trauma or acute-onset symptoms suspected of fracture, intracranial hemorrhage, and/or infarction. At total of 585 cases were collected. Screening by a radiologist revealed acute findings in 82 patients (hemorrhage (N=52), hemorrhagic brain infarction (N=2), infarction (N=15), metastasis (N=2), fracture (N=6), and both fracture and hemorrhage (N=5)).

The selected exams were performed as part of routine patient care using commercially available CT scanners (SOMATOM Force, Siemens Healthineers GmbH, Forchheim, Germany) and a protocol specific to head trauma: 1 second rotation time, collimation of 192×6 mm, pitch of 0.6, 120 kVp, 350 effective mAs, and no tube current modulation. A previously validated projection-domain noise-insertion tool was used to simulate exams with a dose level corresponding to 25% of the original dose. Multiple CT image series were reconstructed from each exam to form the training dataset and the clinical reference images. A summary of the reconstruction parameters used is shown in Table 2. In Table 2 IBHC stands for iterative beam hardening correction.

TABLE 2 non-limiting example image reconstruction settings.

| Series Description | Kernel | Thickness [mm] | Increment [mm] | IBHC | Relative Dose [%] |
|---|---|---|---|---|---|
| Clinical Reference (smooth) | Hr40 | 5.0 | 5.0 | ON | 100 |
| Clinical Reference (sharp) | Hr69 | 0.75 | 0.7 | OFF | 100 |
| Smooth Noisy Input ($\chi^l$smooth) | Hr40 | 0.75 | 0.7 | ON | 25 |
| Sharp Noisy Input ($\chi^l$sharp) | Qr69 | 0.75 | 0.7 | OFF | 25 |
| Smooth Target ($\chi$smooth) | Hr40 | 0.75 | 0.7 | ON | 100 |
| Sharp Target ($\chi$sharp) | Qr69 | 0.75 | 0.7 | ON | 100 |

From this dataset, a total of 110 exams from unique patients were used, including 100 for model training and 10 for validation and hyperparameter tuning. An additional 10 cases were set aside for testing of task independent image quality.

The output of the model was a single low-noise and high-resolution image series that was used to perform diagnostic tasks that would otherwise require multiple series with different reconstruction parameters. The noise levels of the synthesized images were compared with the corresponding smooth-kernel reconstructions by measuring the standard deviation at 3 uniform regions-of-interest (ROIs). Similarly, the soft-tissue contrast of the synthesized images was compared with the corresponding smooth-kernel reconstructions by measuring the contrast between adjacent gray matter and white matter tissues in 3 ROIs. Spatial resolution was evaluated by comparing line profiles for the synthesized images and clinical sharp-kernel images across relevant small-scale features such as skull fractures. Finally, the presence of clinically-relevant artifacts was assessed by visual inspection of pathological ROIs and an informal review with a trained radiologist fellow.

The qualitative performance of the synthesized images in terms of low noise in the brain and preservation of sharp details in the skull was demonstrated in a comparison against the input and reference clinical image series. Compared to the clinical thin sharp kernel, the synthesized images retained sharpness. Simultaneously, the thin slice, low noise, and soft tissue contrast enhancement of the synthesized images also improved visibility of a nearby hemorrhage also visible in the smooth thin slice but made more conspicuous in the synthesized images.

Notably, the addition of $L_{smooth}$ in the task-based loss function Eq. (11) markedly improved noise reduction with improved soft tissue contrast over a CNN denoising model trained with a generic MSE loss, as demonstrated by a line profile comparison of the synthesized images covering a white matter extension of the corona radiata. The gray-matter white-matter contrast definition was also similar to that of the thin slice clinical smooth image series. This gray-white matter enhancement was confirmed with contrast measurements taken by comparing the mean HU in elliptical ROIs covering adjacent regions of gray (odd-numbered ROIs) and white matter (even-numbered ROIs) that showed a comparable contrast between synthesized and smooth clinical images (Table 3). However, when combined with lower noise, shown by standard deviation measurements in three separate regions of gray-matter (Table 4), this results in an overall higher gray-matter white-matter contrast-to-noise ratio (CNR) in processed images.

TABLE 3

Non-limiting example measured contrast between gray matter and white matter across 3 local regions.

| ROI | Smooth 5 mm | Smooth 0.75 mm | CNN MSE 0.75 mm | ZIRCON 0.75 mm |
|---|---|---|---|---|
| 2 | 6.06 | 9.31 | 8.73 | 9.27 |
| 4 | 3.47 | 5.83 | 4.81 | 6.14 |
| 6 | 4.98 | 12.44 | 11.89 | 11.98 |

The performance of preserving high-frequency details was then quantitatively assessed via a line profile measurement along a fracture in the occipital bone where the fracture definition was matched with that of the clinical sharp thin slice image.

The combination of multi-kernel synthesis with a task-specific loss function can effectively combine the favorable image quality properties of the multiple input image series while simultaneously reducing noise. Applied to a neural imaging task the result has low noise and enhanced contrast in the brain while preserving sharp high-frequency features in the skull. The benefits of having such thin-slice image series with low noise levels in the brain are demonstrated by enhanced visibility of a hemorrhage in the center of the brain. The model output quality may depend on the input data quality.

TABLE 4 non-limiting example measured noise in three gray matter ROIs (standard deviation).

| ROI | Smooth 5 mm | Smooth 0.75 mm | CNN MSE 0.75 mm | ZIRCON 0.75 mm |
|---|---|---|---|---|
| 1 | 2.28 | 2.54 | 4.89 | 2.05 |
| 3 | 2.15 | 3.03 | 4.81 | 2.37 |
| 5 | 2.54 | 3.50 | 5.10 | 2.65 |

TABLE 5 non-limiting example measured CNR in three gray-matter white-matter ROIs, calculated as the contrast between gray-matter and white-matter divided by the measured gray matter noise.

| ROI | Smooth 5 mm | Smooth 0.75 mm | CNN MSE 0.75 mm | ZIRCON 0.75 mm |
|---|---|---|---|---|
| 2 | 2.65 | 3.67 | 1.79 | 4.52 |
| 4 | 1.61 | 1.92 | 1.00 | 2.59 |
| 6 | 1.96 | 3.56 | 2.33 | 4.52 |

The non-limiting example results demonstrate that the systems and methods in accordance with the present disclosure are capable of maintaining the relevant image features of both the smooth-kernel and the sharp-kernel images. The combination of sharper reconstruction kernels, thinner slices, and low noise levels results in a clear enhancement of detail in soft-tissue regions. Both qualitative comparisons between the input kernel images and quantitative noise measurements in the brain confirmed the noise reduction performance. Contrast measurements between gray and white matter indicated a successful incorporation of the soft-tissue contrast enhancement derived from the multi-band filtration in the input smooth kernel image. This contrast enhancement combined with lower noise resulted in an overall higher contrast-to-noise ratio between gray and white matter than in any of the clinical kernels. Further enhancement of the visibility of soft tissue lesions was also indicated.

Line profile comparisons across an occipital fracture revealed that preserved sharpness compared to the clinical kernel in maintaining definition of critical pathology.

Given the exponential rise in CT image series due to both the rapid rise in prescribed CT scans and growing number of images per scan there is a demonstrated need to address how to better handle potential information overload. Multi-kernel synthesis is one potential approach at addressing this issue by generating images that more efficiently convey information with anatomy-specific image quality. A CNN-based synthesis method utilizing a task-specific loss function to parameterize training may provide for addressing these challenges, and may also yield an improved image synthesis optimized for applications such as the head, and the like.

The present disclosure has described one or more preferred embodiments, and it should be appreciated that many equivalents, alternatives, variations, and modifications, aside from those expressly stated, are possible and within the scope of the invention.

The invention claimed is:

1. A method for synthesizing computed tomography (CT) image series comprising:

a) reconstructing at least two CT image series, wherein the at least two image series are reconstructed with different reconstruction kernels;

b) synthesizing at least one new CT image series by applying the at least two CT image series to an artificial neural network that has been trained on training data using a task-based loss function comprising a sharp loss term that trains the neural network for similarity with a sharp kernel target and a smooth loss term that trains the neural network for similarity with a smooth kernel target.

2. The method of claim 1, wherein the different reconstruction kernels include a smooth kernel and a sharp kernel, such that the at least two CT image series comprise at least a smooth kernel image series and a sharp kernel image series.

3. The method of claim 2, wherein the task-based loss function is expressed as:

$$L(z, x_{smooth}, x_{sharp}) = L_{sharp}(z, x_{sharp}) + L_{smooth}(z, x_{smooth}),$$

where $L_{smooth}$ constrains low-contrast features in a synthesized image z to be similar to those of smooth kernel $x_{smooth}$; and $L_{sharp}$ constrains small-scale features in z to be similar to sharp kernel $x_{sharp}$.

4. The method of claim 1 further comprising training the artificial neural network on a training dataset, wherein the training dataset is created by inserting noise into full-dose CT data to create low-dose CT data.

5. The method of claim 4, wherein training the artificial neural network on the training data comprises:

applying the training dataset to the artificial neural network, generating model output data;

calculating a sharp kernel loss using the sharp loss term applied to the model output data;

generating kernel converted model output data by applying a kernel conversion to the model output data; and calculating a smooth kernel loss using the smooth loss term applied to the kernel converted model output data.

6. The method of claim 5, wherein kernel conversion includes filtering the model output data with a fixed isotropic Gaussian kernel.

7. The method of claim 1 wherein synthesizing the at least one CT image series includes combining image qualities of the at least two CT image series and wherein image qualities include at least one of spatial resolution, noise, contrast to noise ratio, or signal to noise ratio.

8. The method of claim 1 further comprising determining domains in which the task-based loss function operates by determining a range of Hounsfield units (HU) between anatomic regions of interest in the at least one new CT image series using intensity thresholding.

9. The method of claim 1 further comprising displaying the synthesized at least one new CT image series for a user.

10. A system for synthesizing computed tomography (CT) image series comprising:

a computer system configured to:

i) reconstruct at least two CT image series, wherein the at least two image series are reconstructed with different reconstruction kernels;

ii) synthesize at least one new CT image series by applying the at least ii) two CT image series to an artificial neural network that has been trained on training data using a task-based loss function comprising a sharp loss term that trains the neural network for similarity with a sharp kernel target and a smooth loss term that trains the neural network for similarity with a smooth kernel target.

11. The system of claim 10, wherein the different reconstruction kernels include a smooth kernel and a sharp kernel, such that the at least two CT image series comprise at least a smooth kernel image series and a sharp kernel image series.

12. The system of claim 11, wherein the task-based loss function is expressed as:

$$L(z, x_{smooth}, x_{sharp}) = L_{sharp}(z, x_{sharp}) + L_{smooth}(z, x_{smooth})$$

where $L_{smooth}$ constrains low-contrast features in a synthesized image z to be similar to those of smooth kernel $x_{smooth}$; and $L_{sharp}$ constrains small-scale features in z to be similar to sharp kernel $x_{sharp}$.

13. The system of claim 10, wherein the computer system is further configured to train the artificial neural network on a training dataset, wherein the training dataset is created by inserting noise into full-dose CT data to create low-dose CT data.

14. The system of claim 13, wherein the computer system being further configured to train the artificial neural network on the training data comprises:

applying the training dataset to the artificial neural network, generating model output data;

calculating a sharp kernel loss using the sharp loss term applied to the model output data;

generating kernel converted model output data by applying a kernel conversion to the model output data; and calculating a smooth kernel loss using the smooth loss term applied to the kernel converted model output data.

15. The system of claim 14, wherein the computer system is further configured to perform kernel conversion by filtering the model output data with a fixed isotropic Gaussian kernel.

16. The system of claim 10, wherein the computer system is further configured to synthesize the at least one CT image series by combining image qualities of the at least two CT image series and wherein image qualities include at least one of spatial resolution, noise, contrast to noise ratio, or signal to noise ratio.

17. The system of claim 10, wherein the computer system is further configured to determine domains in which the task-based loss function operates by determining a range of Hounsfield units (HU) between anatomic regions of interest in the at least one new CT image series using intensity thresholding.

18. The system of claim 10, wherein the computer system is further configured to display the synthesized at least one new CT image series for a user.

* * * * *